US006791356B2

(12) United States Patent
Haycock et al.

(10) Patent No.: US 6,791,356 B2
(45) Date of Patent: Sep. 14, 2004

(54) BIDIRECTIONAL PORT WITH CLOCK CHANNEL USED FOR SYNCHRONIZATION

(75) Inventors: Matthew B. Haycock, Beaverton, OR (US); Stephen R. Mooney, Beaverton, OR (US); Aaron K. Martin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/894,865

(22) Filed: Jun. 28, 2001

(65) Prior Publication Data

US 2003/0001618 A1 Jan. 2, 2003

(51) Int. Cl.$^7$ .......................................... H03K 19/0175
(52) U.S. Cl. .......................................... 326/82; 326/30
(58) Field of Search ............................. 326/82, 30, 26, 326/56, 86, 90

(56) References Cited

U.S. PATENT DOCUMENTS

| | | | | |
|---|---|---|---|---|
| 5,134,311 | A | | 7/1992 | Biber et al. .................. 307/270 |
| 5,216,667 | A | | 6/1993 | Chu et al. ..................... 370/24 |
| 5,325,355 | A | * | 6/1994 | Oprescu et al. ............... 370/24 |
| 5,481,207 | A | | 1/1996 | Crafts .......................... 326/86 |
| 5,530,377 | A | | 6/1996 | Walls ........................... 326/30 |
| 5,541,535 | A | | 7/1996 | Cao et al. ...................... 326/83 |
| 5,578,939 | A | | 11/1996 | Beers et al. ................... 326/30 |
| 5,579,336 | A | | 11/1996 | Fitzgerald et al. ........... 375/219 |
| 5,604,450 | A | | 2/1997 | Borkar et al. ................. 326/82 |

(List continued on next page.)

OTHER PUBLICATIONS

Comer, D.T., et al., "A CMOS Voltage to Current Converter For Low Voltage Applications", This information is directly from Donald T. Comer's web site, http://www.ee.byu.edu/faculty/comerdt/publications.html, 13 p., (Feb. 11, 1997).

Farjad–Rad, R., et al., "A 0.4–um CMOS 10–Gb/s 4–PAM Pre–Emphasis Serial Link Transmitter", *IEEE Journal of Solid–State Circuits, 34* (5), pp. 580–585, (May 1999).

Filanovsky, I.M., "Voltage Reference Using Mutual Compensation of Mobility and Threshold Voltage Temperature Effects", *ISCAS 2000—IEEE International Symposium on Circuits and Systems,* pp. V197–V200, (May 2000).

Haycock, M., et al., "A 2.5Gb/s Bidirectional Signaling Technology", *Hot Interconnects Symposium V,* pp. 1–8, (Aug. 1997).

Lee, S., et al., "A Temperature and Supply–Voltage Insensitive CMOS Current Reference", *IEICE Trans. Electron,* vol. E82–C, pp. 1562–1566, (Aug. 1999).

*Primary Examiner*—Daniel Chang
(74) *Attorney, Agent, or Firm*—Schwegman, Lundberg, Woessner & Kluth, P.A.

(57) ABSTRACT

A simultaneous bidirectional port coupled to a bus combines a synchronization circuit and a clock circuit. The synchronization and clock circuit synchronizes the port with another simultaneous data port coupled to the same bus. A clock driver circuit is provided that is capable of being turned on and off. Prior to synchronization, the clock driver is off, and after synchronization, the clock driver is on. A clock receiver circuit includes a clock detection circuit to detect the presence of an input clock signal. When an integrated circuit is ready to communicate, the output clock driver is turned on and the clock detection circuit is monitored to determine when an input clock signal is received. When both the output clock driver is turned on, and an input clock signal is being received, the simultaneous bidirectional port is synchronized, and communication between integrated circuits can take place.

27 Claims, 9 Drawing Sheets

U.S. PATENT DOCUMENTS

| | | | |
|---|---|---|---|
| 5,621,335 A | | 4/1997 | Andresen .................. 326/30 |
| 5,663,661 A | * | 9/1997 | Dilon et al. ................ 326/30 |
| 5,675,811 A | * | 10/1997 | Broedner et al. .......... 395/750 |
| 5,778,204 A | | 7/1998 | Van Brunt et al. ......... 395/308 |
| 5,787,298 A | * | 7/1998 | Broedner et al. ...... 395/750.05 |
| 5,874,837 A | | 2/1999 | Manohar et al. ............ 326/83 |
| 5,977,796 A | | 11/1999 | Gabara ...................... 626/86 |
| 6,087,847 A | | 7/2000 | Mooney et al. ............. 326/30 |
| 6,087,853 A | | 7/2000 | Huber et al. ................ 326/83 |
| 6,107,856 A | | 8/2000 | Bitting ..................... 327/307 |
| 6,118,310 A | | 9/2000 | Esch, Jr. .................... 327/108 |
| 6,157,206 A | | 12/2000 | Taylor et al. ............... 326/30 |
| 6,226,331 B1 | | 5/2001 | Gambuzza ................ 375/258 |
| 6,256,234 B1 | | 7/2001 | Keeth et al. ........... 365/189.05 |
| 6,329,843 B1 | | 12/2001 | Hirata et al. ................ 326/82 |
| 6,366,867 B2 | | 4/2002 | Sine et al. .................. 326/27 |

* cited by examiner

BIDIRECTIONAL PORT WITH CLOCK CHANNEL USED FOR SYNCHRONIZATION

FIELD

The present invention relates generally to digital data ports, and more specifically to bidirectional digital data ports.

BACKGROUND OF THE INVENTION

Integrated circuits typically communicate with other integrated circuits on wires that are part of a "bus." A typical bus includes many wires, or circuit board traces, connecting multiple integrated circuits. Some buses are "unidirectional," because signals only travel in one direction on each wire of the bus. Other buses are "bidirectional," because signals travel in more than one direction on each wire of the bus. In the past, most bidirectional buses were not "simultaneously bidirectional," because multiple signals did not travel on the same wire in opposite directions at the same time; instead, the bus was shared over time, and different signals traveled in different directions at different points in time. Some newer buses are "simultaneous bidirectional" buses. Simultaneous bidirectional buses allow data to travel in two directions on a single wire at the same time.

Before reliable communications can take place on a bus, the integrated circuits need to be ready to communicate, or be "synchronized," and each circuit on the bus should have information regarding the readiness of other circuits on the bus. Some circuits may need to be initialized, while others may need to become stabilized. In some bus applications, it can take an indeterminate amount of time for circuits to become ready to reliably communicate. It can be important to not drive data onto a bus until the intended receiver is ready to receive the data, especially in simultaneous bidirectional bus applications, where data is being driven in both directions at once.

For the reasons stated above, and for other reasons stated below which will become apparent to those skilled in the art upon reading and understanding the present specification, there is a need in the art for a method and apparatus to provide a synchronization mechanism for simultaneous bidirectional data buses.

DESCRIPTION OF EMBODIMENTS

Figure 1:
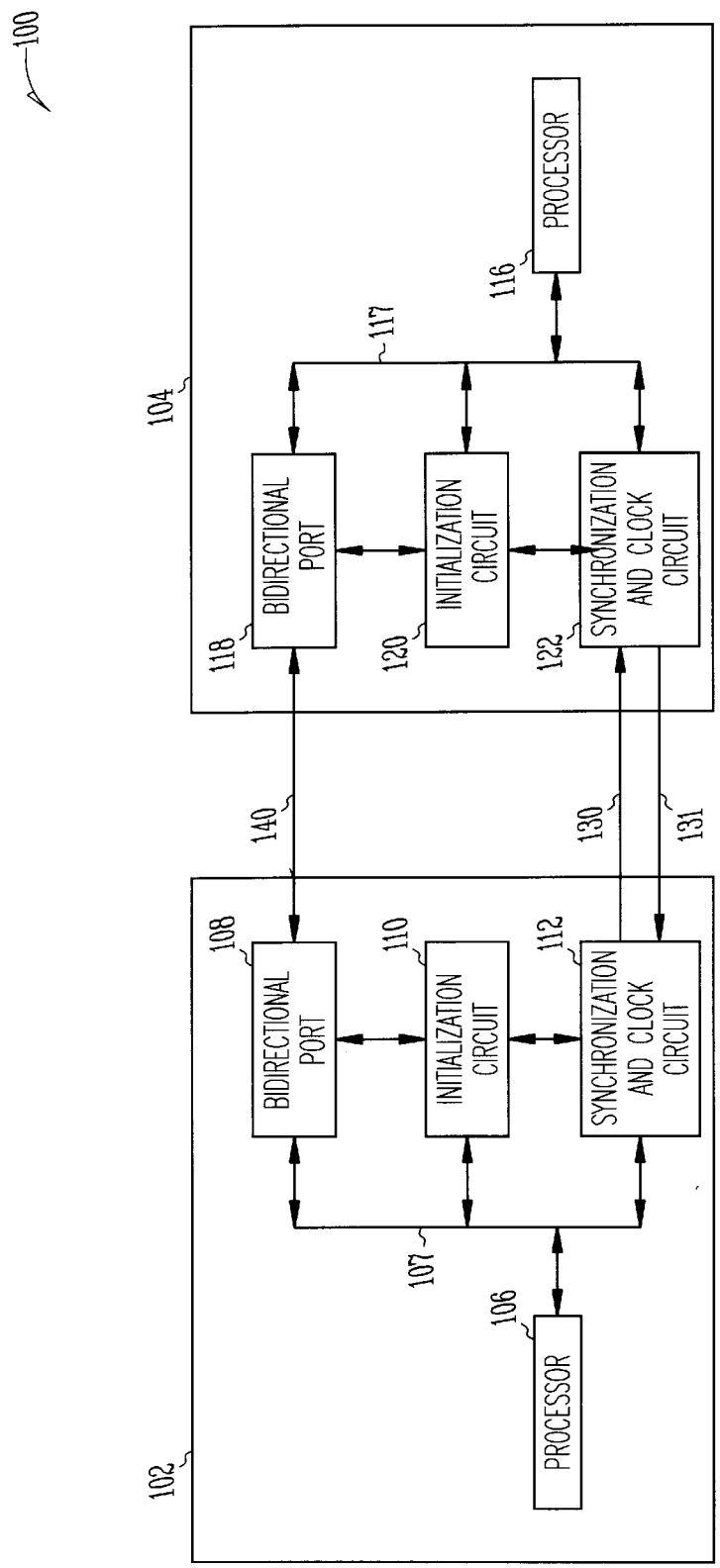
FIG. 1 shows a system employing simultaneous bidirectional ports.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism to synchronize multiple simultaneous bidirectional ports on the same bus. A clock driver circuit is provided that is capable of being turned on and off. Prior to synchronization, the clock driver is off, and after synchronization, the clock driver is on. A clock receiver circuit is also provided. The clock receiver circuit includes a clock detection circuit to detect the presence of an input clock signal. When an integrated circuit is ready to communicate, it turns the output clock driver on and monitors the clock detection circuit to determine when an input clock signal is received. When both the output clock driver is turned on, and an input clock signal is being received, the simultaneous bidirectional port is synchronized, and communication between integrated circuits can take place.

Referring now to the figures, FIG. 1 shows a system employing simultaneous bidirectional ports. System 100 includes integrated circuits 102 and 104 interconnected by conductors 130 and 140. Integrated circuit 102 includes processor 106, bidirectional port 108, initialization circuit 110, and synchronization and clock circuit 112. Integrated circuit 104 includes processor 116, bidirectional port 118, initialization circuit 120, and synchronization and clock circuit 122. In embodiments represented by FIG. 1, integrated circuits 102 and 104 are shown having substantially similar circuits, such as processors 106 and 116. In other embodiments, integrated circuits 102 and 104 do not have substantially similar circuits. For example, integrated circuits 102 and 104 can be processors, processor peripherals, memory devices including dynamic random access memories (DRAM), memory controllers, or any other integrated circuit employing simultaneous bidirectional ports.

Integrated circuits 102 and 104 are agents on a simultaneous bidirectional bus. The simultaneous bidirectional bus can include any number of signal lines, but for simplicity, FIG. 1 shows one signal line, conductor 140. Likewise, agents on the simultaneous bidirectional bus can include any number of bidirectional ports, and bidirectional ports can include any number of drivers and receivers. To simplify the explanation, each of integrated circuits 102 and 104 are shown with a single bidirectional port.

Integrated circuits 102 and 104 communicate with each other using bidirectional ports 108 and 118. Each bidirectional port sends and receives data on conductor 140. Initialization circuits 110 and 120 operate to initialize all or portions of integrated circuits 102 and 104. For example, in some embodiments, initialization circuit 110 initializes a control loop in bidirectional port 108. Examples of control loops that can be initialized include variable output impedance circuits, variable slew rate circuits, and variable current sources. Other types of initialization operations can be performed by initialization circuit 110 without departing from the scope of the present invention. Embodiments of initialization circuits are described in more detail below with reference to later figures.

Integrated circuits 102 and 104 also communicate with each other using synchronization and clock circuits 112 and 122. Each synchronization and clock circuit communicates with the other using a conductor. For example, synchronization and clock circuit 112 communicates with synchronization and clock circuit 122 using conductor 130, and communication is achieved in the opposite direction using conductor 131. In operation, synchronization and clock circuits 112 and 122 alert each other that initialization of the respective integrated circuit is complete, and also serve as clock driver and receiver circuits. When initialization of both integrated circuits is complete, each synchronization and clock circuit can report this to the integrated circuit within which it is situated. For example, when initialization circuit 120 reports to synchronization and clock circuit 122 that initialization is complete, synchronization and clock circuit 122 can drive a clock signal on conductor 131. When initialization circuit 110 within integrated circuit 102 completes initialization, synchronization and clock circuit 112 can drive another clock signal on conductor 130. When synchronization circuits 112 and 122 have driven clock signals on conductors 130 and 131, respectively, initialization of both integrated circuits 102 and 104 is complete. At this time, synchronization and clock circuits 112 and 122 can report to integrated circuits 102 and 104, respectively, that initialization on both ends of the simultaneous bidirectional bus is complete, and the agents on the bus are ready to communicate.

In some embodiments, initialization circuit 110 initializes bidirectional port 108, and alerts synchronization and clock circuit 112 when initialization is complete. For example, a closed loop impedance control circuit can initialize the output impedance of a data driver in bidirectional port 108, and directly notify synchronization and clock circuit 112 when the output impedance of the data driver is set. In other embodiments, initialization circuit 110 communicates with processor 106 to report the completed initialization, and processor 106 communicates with synchronization and clock circuit 112.

In some embodiments, when synchronization and clock circuits 112 and 122 both report that initialization is complete, synchronization and clock circuit 112 within integrated circuit 102 notifies processor 106. This can be performed through an interrupt, by polling, or by any other suitable processor communication mechanism. Processor 106 then communicates with bidirectional port 108 to report that initialization is complete, and that simultaneous bidirectional communications can take place.

The initialization provided by initialization circuits 110 and 120 can be performed at system star-tup, or after an event that cause a re-initialization. For example, when system power is applied, initialization circuits 110 and 120 provide start-up initialization. Also for example, when a portion of system 100 is reset or is subject to a large noise event, re-initialization may take place. Initialization can also take place during a hot-swap event, when one or more system components are removed or added to the system while power is applied.

In embodiments represented by FIG. 1, initialization circuit 110 is shown separate from processor 106 and bidirectional port 108. This structure emphasizes the initialization of the bidirectional port. In other embodiments, the initialization function is performed by dedicated circuitry within the bidirectional port, and in other embodiments, the processor performs all or part of the initialization functions.

Processors 106 and 116 are shown communicating with other circuits using busses 107 and 117, respectively. In some embodiments, bus 107 includes many physical signal lines to carry signals such as outbound data, inbound data, signals to cause initialization, and signals to indicate initialization is complete.

The remainder of this description is divided into two sections, representing two general classes of embodiments: voltage mode embodiments and current mode embodiments. Although only two classes of embodiments are described in detail, one of ordinary skill in the art will understand that other embodiments exist, and that those embodiments are intended to be within the scope of the present invention.

Voltage Mode Embodiments

This class of embodiments is referred to as "voltage mode embodiments" because drivers on the simultaneous bidirectional bus drive a voltage thereon. This is in contrast to current mode embodiments, described below, that drive a current on the simultaneous bidirectional bus.

Figure 2:
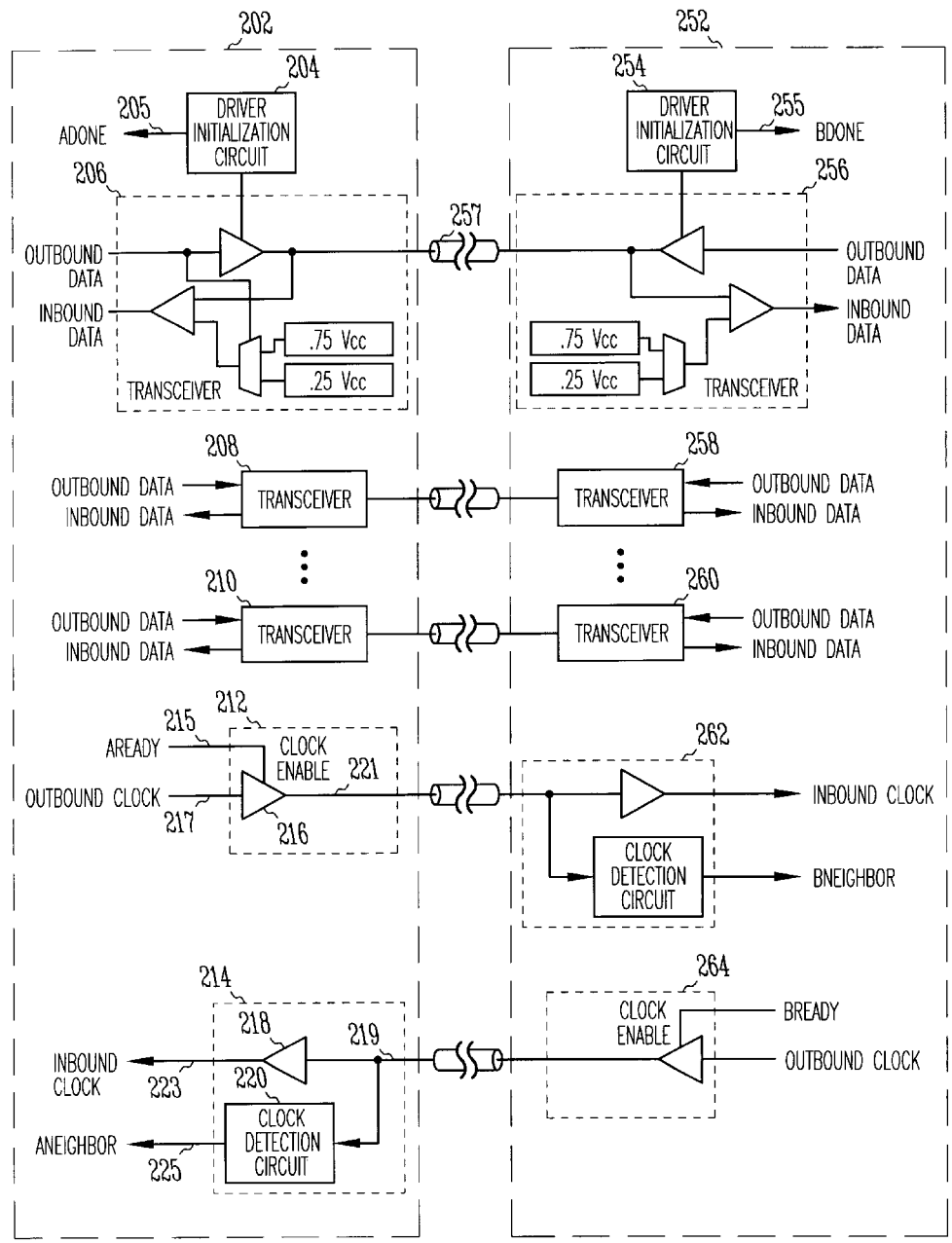
FIG. 2 shows a diagram of two integrated circuits coupled together.

FIG. 2 shows a diagram of two integrated circuits coupled together. Integrated circuits 202 and 252 are coupled by a simultaneous bidirectional port and synchronization and clock circuits. For the purposes of explanation, integrated circuit 202 is considered to be the "A" agent on the simultaneous bidirectional bus, and integrated circuit 252 is considered to be the "B" agent on the same simultaneous bidirectional bus. Nodes and signals pertaining to the synchronization and clock circuit within integrated circuit 202 are prefixed with the letter "A," and nodes and signals pertaining to the synchronization and clock circuit within integrated circuit 252 are prefixed with the letter "B."

Integrated circuit 202 includes transceivers 206, 208, and 210, driver initialization circuit 204, clock driver circuit 212, and clock receiver circuit 214. Transceivers 206, 208, and 210 correspond to bidirectional port 108 (FIG. 1), driver initialization circuit 204 corresponds to initialization circuit 110 (FIG. 1), and the combination of clock driver circuit 212 and clock receiver circuit 214 corresponds to synchronization and clock circuit 112 (FIG. 1). Any number of transceivers can exist within integrated circuits 202 and 252. For ease of explanation, three transceivers are shown within integrated circuit 202 and 252.

Driver initialization circuit 204 provides initialization functions to transceivers 206, 208, and 210, and asserts an ADONE signal on node 205 when initialization is complete. For ease of illustration, FIG. 2 shows driver initialization circuit 204 coupled only to transceiver 206. In some embodiments, driver initialization circuit 204 is coupled to every driver within the integrated circuit.

Clock driver circuit 212 includes clock driver 216. Clock driver 216 receives an OUTBOUND CLOCK signal on node 217 and receives an AREADY signal on clock enable node 215. When the AREADY signal on node 215 is asserted, clock driver 216 drives a clock signal off of integrated circuit 202 on node 221. When the AREADY signal on node 215 is de-asserted, clock driver 216 does not drive a clock signal on node 221. In some embodiments, clock driver 216 presents a high impedance to node 221 when the AREADY signal on node 215 is de-asserted. In other embodiments, clock driver 216 drives a static voltage value on node 221 when the AREADY signal on node 215 is de-asserted. Driver circuits suitable for use as clock driver 216 are known to those of ordinary skill in the art.

Clock receiver circuit 214 includes clock receiver 218 and clock detection circuit 220. Clock receiver 218 and clock detection circuit 220 both have input nodes coupled to node 219 to receive a clock signal from a node external to integrated circuit 202. Clock receiver circuit 218 receives an external clock signal on node 219 and provides the INBOUND CLOCK signal to integrated circuit 202 on node 223. Clock detection circuit 220 receives the external clock signal on node 219 and provides the ANEIGHBOR signal to integrated circuit 202 on node 225.

In some embodiments, clock detection circuit 220 includes a state machine to detect a sequence of voltage transitions on node 219. When a sequence of voltage transitions is detected on node 219, the state machine asserts the ANEIGHBOR signal to indicate that a clock has been detected. In other embodiments, clock detection circuit 220 includes a phase locked loop to detect the presence of a clock signal on node 219. When the phase locked loop locks, a lock indication is utilized to assert the ANEIGHBOR signal to indicate that a clock signal is present on node 219. In still other embodiments, clock detection circuit 220 includes a delay locked loop.

Integrated circuit 252 includes driver initialization circuit 254, transceivers 256, 258, and 260, clock driver circuit 264, and clock receiver circuit 262. The description of integrated circuit 252 is the same as that provided above for integrated circuit 202 with the exception of some signals being prefixed with a "B" rather than an "A."

In operation, driver initialization circuits 204 and 254 provide initialization functions to the various data transceivers, and assert ADONE and BDONE signals when the initialization functions are complete. Each of the ADONE and BDONE signals provides an indication to the respective integrated circuit that the initialization is complete. For example, when driver initialization in integrated circuit 202 is complete, the ADONE signal is asserted, and when driver initialization in integrated circuit 252 is complete, the BDONE signal is asserted.

When one of integrated circuits 202 and 252 is ready to communicate with the other, such as when initialization is complete, the appropriate READY signal is asserted. For example, when integrated circuit 202 is ready to communicate over the simultaneous bidirectional bus, integrated circuit 202 asserts the AREADY signal. As a result, clock driver circuit 212 drives a clock signal on node 221 and the BNEIGHBOR signal is asserted within integrated circuit 252. Also for example, when integrated circuit 202 is ready to communicate over the simultaneous bidirectional bus, integrated circuit 252 asserts the BREADY signal. As a result, clock driver circuit 264 drives a clock signal on node 219 and the ANEIGHBOR signal is asserted within integrated circuit 202.

Referring now back to FIG. 1, processor 106 is shown communicating with other circuits using bus 107. Bus 107 corresponds to the outbound data, inbound data, ADONE, AREADY, and ANEIGHBOR signals shown in FIG. 2. When initialization is complete, processor 106 receives an asserted ADONE signal. Processor 106 then asserts the AREADY signal to indicate that it is ready to communicate across the simultaneous bidirectional bus. Processor 106 monitors the ANEIGHBOR signal to determine when the other agent on the simultaneous bidirectional bus is ready. When both the AREADY signal is asserted, and the ANEIGHBOR is asserted, then processor 106 has the necessary indications to show that both integrated circuits are ready to communicate.

Referring now back to FIG. 2, integrated circuits 202 and 252 utilize clock signal lines for two purposes. Prior to communication taking place on the bus, the clock signal lines are used for synchronization purposes. Only when a clock signal is present on the clock signal lines, and the presence of the clock signals has been detected, does communication take place. Once communications take place on the bus, the clock signal lines are utilized for the transmission of clock signals. By utilizing clock signal lines for synchronization purposes, the need for a dedicated signal line for synchronization purposes is obviated. This reduces the external pin count on integrated circuits 202 and 252, which reduces the packaging cost of the integrated circuits.

Driver initialization circuits 204 and 254 can provide a variety of initialization functions. Exemplary initialization functions are now presented.

Figure 3:
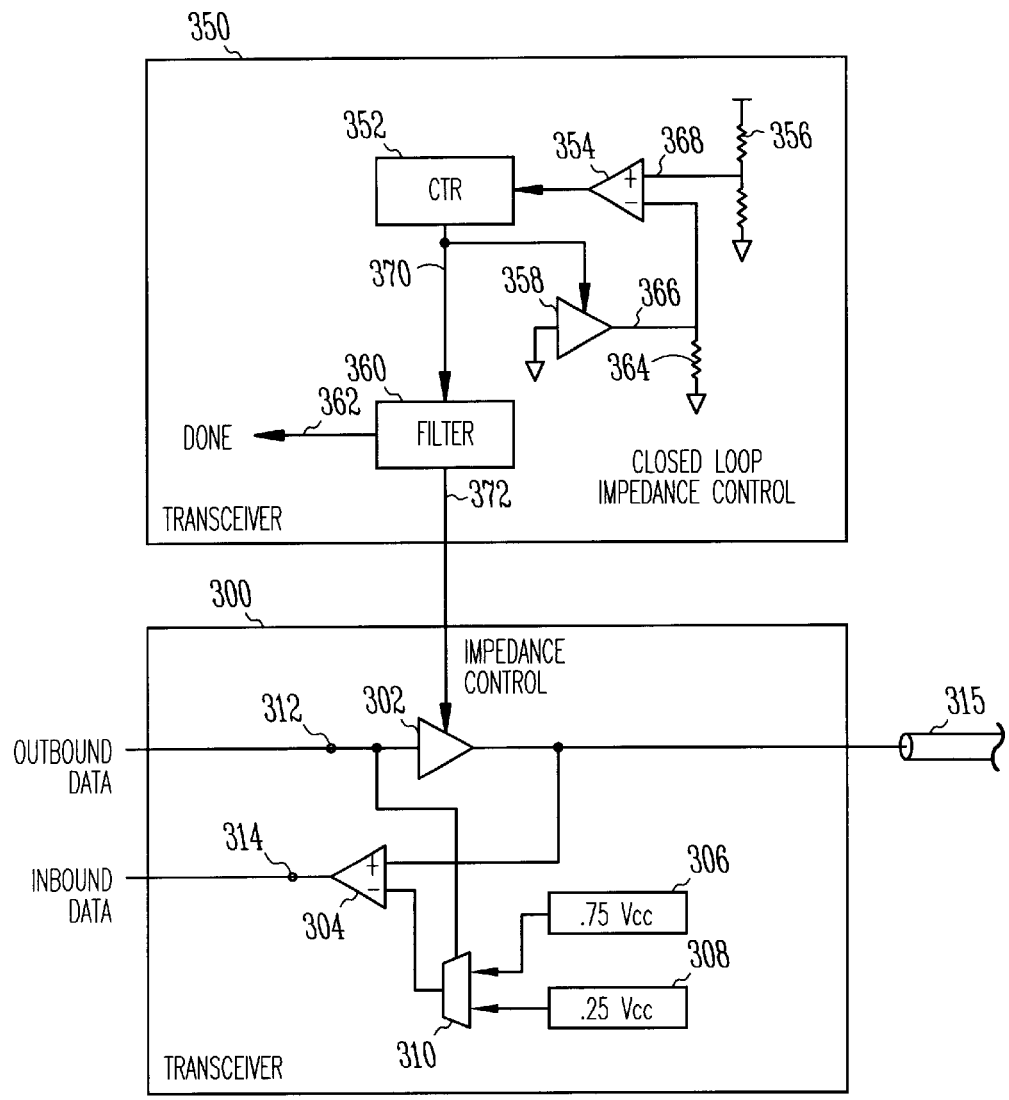
FIG. 3 shows a simultaneous bidirectional port circuit with closed loop impedance control.

FIG. 3 shows a simultaneous bidirectional port circuit with closed loop impedance control. Simultaneous bidirectional port circuit 300 is a data transceiver circuit such as those shown in FIG. 2. Closed loop impedance control circuit 350 is an initialization circuit in an integrated circuit, such as initialization circuit 110 or 120 (FIG. 1), or driver initialization circuit 204 or 254 (FIG. 2). Simultaneous bidirectional port circuit 300 includes driver 302, receiver 304, multiplexer 310 and voltage references 306 and 308. The output node of driver 302 drives conductor 315, and is also the input node for receiver 304. Conductor 315 is simultaneously driven by another driver in another simultaneous bidirectional port circuit, and receiver 304 determines the logic value driven on conductor 315 by the other driver. For example, referring now back to FIG. 2, transceivers 206 and 256 both include drivers and receivers such as driver 302 and receiver 304. The receiver in transceiver 206 determines the logic value driven on conductor 257 by the driver in transceiver 256, and the receiver in transceiver 256 determines the logic value driven on the conductor by the driver in transceiver 206.

Receiver 304 compares the voltage value on conductor 315 to the voltage value of either reference 306 or reference 308 depending on the state of the outbound data on node 312. The outbound data steers multiplexer 310 so that one of reference 306 and reference 308 is present on one of the inputs to receiver 304. Details of one embodiment of a simultaneous bidirectional port can be found in U.S. Pat. No. 5,604,450, issued Feb. 18, 1997.

Figure 4:
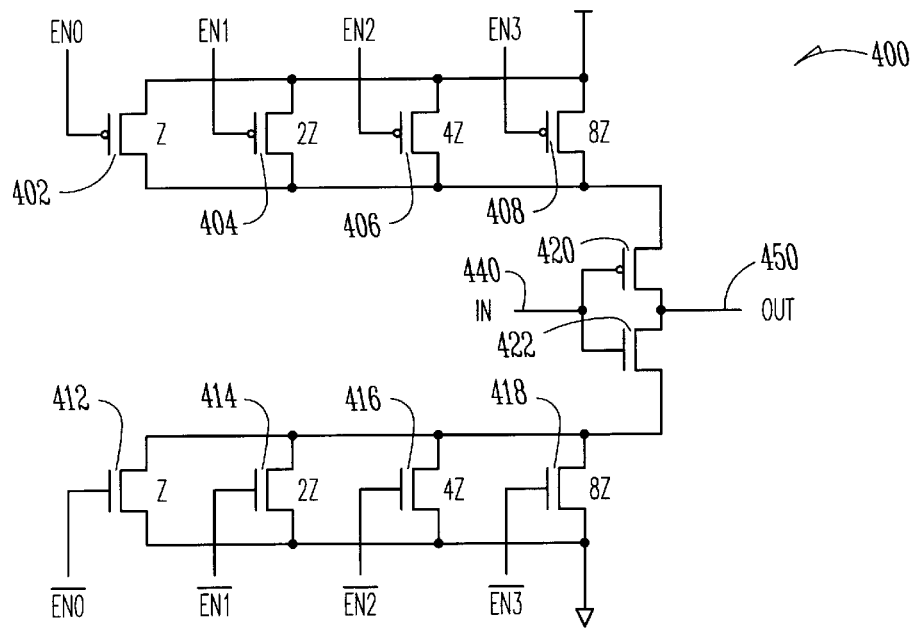
FIG. 4 shows a driver with controllable output impedance.

Driver 302 is a driver having a controllable output impedance, one embodiment of which is shown in FIG. 4. The output impedance of driver 302 is controlled by closed loop impedance control circuit 350. Closed loop impedance control circuit 350 includes sample and compare circuit 354, up/down counter 352, dummy driver 358, and digital filter 360. The control loop is formed by sample and compare circuit 354, up/down counter 352, and dummy driver 358. Dummy driver 358 is terminated with resistor 364. In some embodiments, resistor 364 is a precision resistor external to the integrated circuit that includes closed loop impedance control circuit 350. This allows a system designer to select a value for resistor 364, thereby selecting a reference voltage present on node 366.

The voltage on node 366, which is a function of the output impedance of dummy driver 358, is compared with a target voltage on node 368 by sample and compare circuit 354. In some embodiments, sample and compare circuit 354 is an analog comparator that samples the voltage values on nodes 366 and 368, compares them, and produces a digital signal on the output to signify which of the two input voltage values is larger. The output of sample and compare circuit 354 controls the counting of up/down counter 352. Up/down counter 352 produces an unfiltered impedance control value on node 370, which controls the output impedance of dummy driver 358, and closes the loop. When the impedance of dummy driver 358 needs to be decreased, up/down counter 352 counts in one direction, and when the impedance of dummy driver 358 needs to increase, up/down counter 352 counts in the other direction. The unfiltered impedance control value on node 370 can include a single bit, but can also include a plurality of bits. When a single bit is used, the impedance value toggles between two values, and when N bits are used, the impedance can take on any of $2^N$ different values.

When the control loop of impedance control circuit 350 locks, the unfiltered impedance control signal alternates between two values. This results from the fact that the change in output impedance of dummy driver 358 causes the voltage on node 366 to surpass the voltage on node 368. In one embodiment, for each successive clock cycle thereafter, the unfiltered impedance control signal on node 366 alternates counting up and down as the voltage on node 366 alternates higher and lower than the target voltage on node 368.

Impedance control circuit 350 also includes digital filter 360. Digital filter 360 receives the unfiltered impedance control value on node 370 and produces a filtered impedance control value on node 372. The filtered impedance control value on node 372 controls the output impedance of driver 302 in simultaneous bidirectional port 300. When the loop is locked and the unfiltered impedance control signal alternates between two values, digital filter 360 provides a steady state filtered impedance control signal to driver 302 on node 372. In addition, when the loop is locked, the digital filter outputs a DONE signal on node 362, signifying that the closed loop impedance control circuit has initialized. This corresponds to the ADONE signal on node 205 (FIG. 2).

FIG. 4 shows a driver with controllable output impedance. Driver 400 is a driver, such as driver 302, capable of driving a bidirectional data line. The enable signals (EN0-EN3) correspond to the impedance control value on node 372 (FIG. 3).

Driver 400 includes input node 440 and output node 450. Input node 440 is coupled to the gate of PMOS transistor 420, and is also coupled to the gate of NMOS transistor 422. Transistors 420 and 422 are examples of isolated gate field effect transistors. Transistor 420 is a p-channel metal oxide semiconductor field effect transistor (PMOS) and transistor 422 is an n-channel metal oxide semiconductor field effect transistor (NMOS). Taken together, PMOS transistor 420 and NMOS transistor 422 function as an inverter. Connected in a cascode arrangement with PMOS transistor 420 are parallel PMOS transistors 402, 404, 406, and 408. Likewise, connected in a cascode arrangement with NMOS transistor 422 are parallel NMOS transistors 412, 414, 416, and 418. Any number of parallel PMOS transistors and parallel NMOS transistors can be on at any time, thereby providing a variable output impedance at node 450. The parallel NMOS and PMOS transistors are sized with a binary weighting such that the output impedance can be controlled with a binary number. For example, PMOS transistor 402 and NMOS transistor 412 have an impedance value of "Z," PMOS transistor 404 and NMOS transistor 414 have an impedance value twice as great, and so on. The binary number in the embodiment of FIG. 4 is four bits wide corresponding to the enable signals labeled EN0 through EN3.

The use of a binary weighted impedance control mechanism allows an up/down counter to be employed to modify the impedance one value at a time. As the control signals from the up/down counter count up, more (or larger) transistors are turned on, and the output impedance drops. Likewise, as the counter counts down, the output impedance increases.

In another embodiment, linear weighting is employed. Linear weighting allows a shift register or other similar component to control the output impedance by changing one bit at a time. A driver having linear weighted impedance control allows for precise control of the output impedance with reduced chance of glitches at the expense of increased signal lines and transistor count. For example, in embodiments represented by FIG. 4, four enable signals provide 16 different output impedance values. A linear weighted output driver with 16 impedance values includes 16 parallel NMOS transistors and 16 parallel PMOS transistors driven by 16 control signals. Linear weighted drivers can be implemented without departing from 30 the scope of the present invention.

Figure 5:
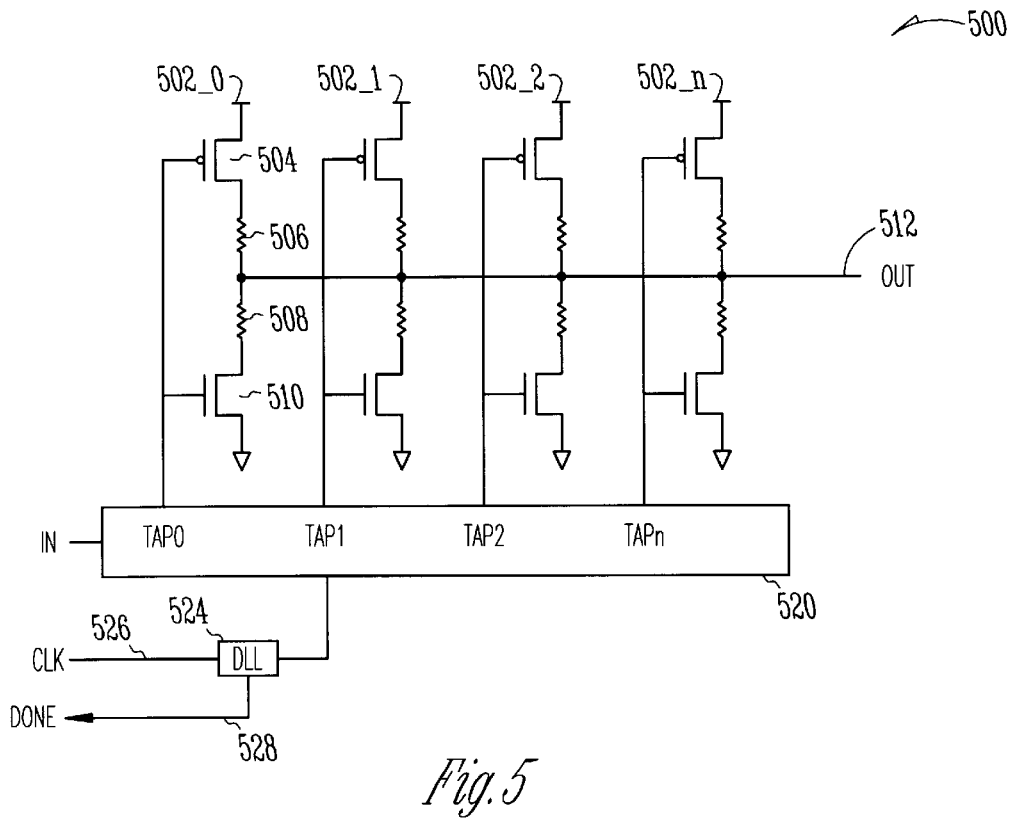
FIG. 5 shows a driver with controllable output slew rate.

FIG. 5 shows a driver with controllable output slew rate. Driver circuit 500 includes a plurality of push-pull driver circuits 502_0 to 502_n. Each push-pull driver circuit includes a pullup transistor 504, a pullup resistor 506, a pulldown resistor 508, and a pulldown transistor 510. The series resistors of each push-pull driver circuit have a resistance which is relatively large in relation to an impedance of the transistors. As such, the series coupled resistors 506 and 508 dominate the series impedance, and the push-pull driver circuit has good linearity from power rail to power rail. The resistors can be fabricated from any suitable structure, such as an N-well layer of a standard CMOS process.

The number of push-pull driver circuits provided in driver circuit 500 is determined by a number of taps provided by a delay line circuit 520. That is, delay line circuit 520 includes a plurality of delay stages which are tapped to provide a number of delayed signals. In the embodiment illustrated in FIG. 5, the delay line circuit has four taps. Each push-pull direr circuit is turned on in sequence, according to the delay between the taps in delay line 520. The output signal on node 512 transitions from the negative voltage rail to the positive voltage rail in a plurality of discrete steps as the push-pull driver circuits turn on in sequence. The number of steps corresponds to the number (n+1) of push-pull driver circuits provided in the driver circuit. In some embodiments, the output signal on node 512 is filtered to provide a linearly varying signal as the push-pull driver circuits turn on or off.

Delay line 520 can be implemented in several ways. In one embodiment, the delay line can be implemented as a string of inverter circuits. This embodiment provides a resolution between consecutive tap output signals of two inverter delays. Two strings of inverters can be provided to achieve a resolution of one inverter, one driven by input data and the other driven by an inverse of the input data. In either embodiment, jitter may be experienced through the driver circuit that is close to jitter of a standard output circuit. To reduce this jitter, the delay line circuit can be coupled to receive a delay control signal from a delay locked loop circuit 524. The delay of the delay circuit, therefore, is locked to a clock signal and remains stable with respect to process, voltage, and temperature variations. Further, low-to-high and high-to-low signal transitions in the tap output signals are equal.

In embodiments that include delay locked loop 524, a period of time lapses as the delay of the delay circuit is locked to the clock signal on node 526. When the delay locked loop is locked, delay locked loop 524 can produce a DONE signal on node 528 to alert a synchronization circuit such as synchronization and clock circuit 112 (FIG. 1) that initialization is complete.

Driver circuit 500 is but one embodiment of a driver having output slew rate control. Other driver circuits can also be used. In addition, driver circuit 500 can be combined with driver circuit 400 (FIG. 4) to create a single driver with variable output impedance and variable output slew rate.

Figure 6:
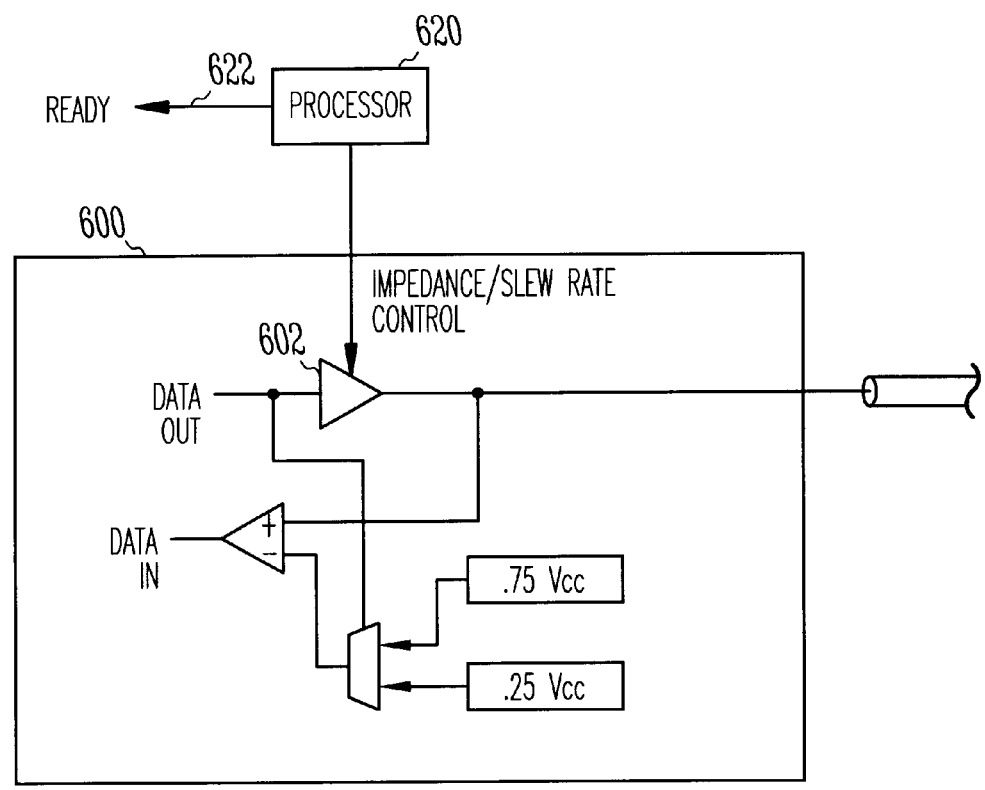
FIG. 6 shows a simultaneous bidirectional port circuit with impedance and slew rate control.

FIG. 6 shows a simultaneous bidirectional port circuit with impedance and slew rate control. Simultaneous bidirectional port circuit 600 is shown coupled to processor 620. In the embodiment illustrated in FIG. 6, processor 620 controls the output impedance and slew rate of driver 602. When the output impedance and slew rate of driver 602 is initialized, processor 620 can assert the DONE signal on node 622, thereby alerting a synchronization circuit that initialization is complete.

Current Mode Embodiments

This class of embodiments is referred to as "current mode embodiments" because drivers on the simultaneous bidirectional bus drive a current thereon. This is in contrast to voltage mode embodiments, described above, that drive a voltage on the simultaneous bidirectional bus.

Figure 7:
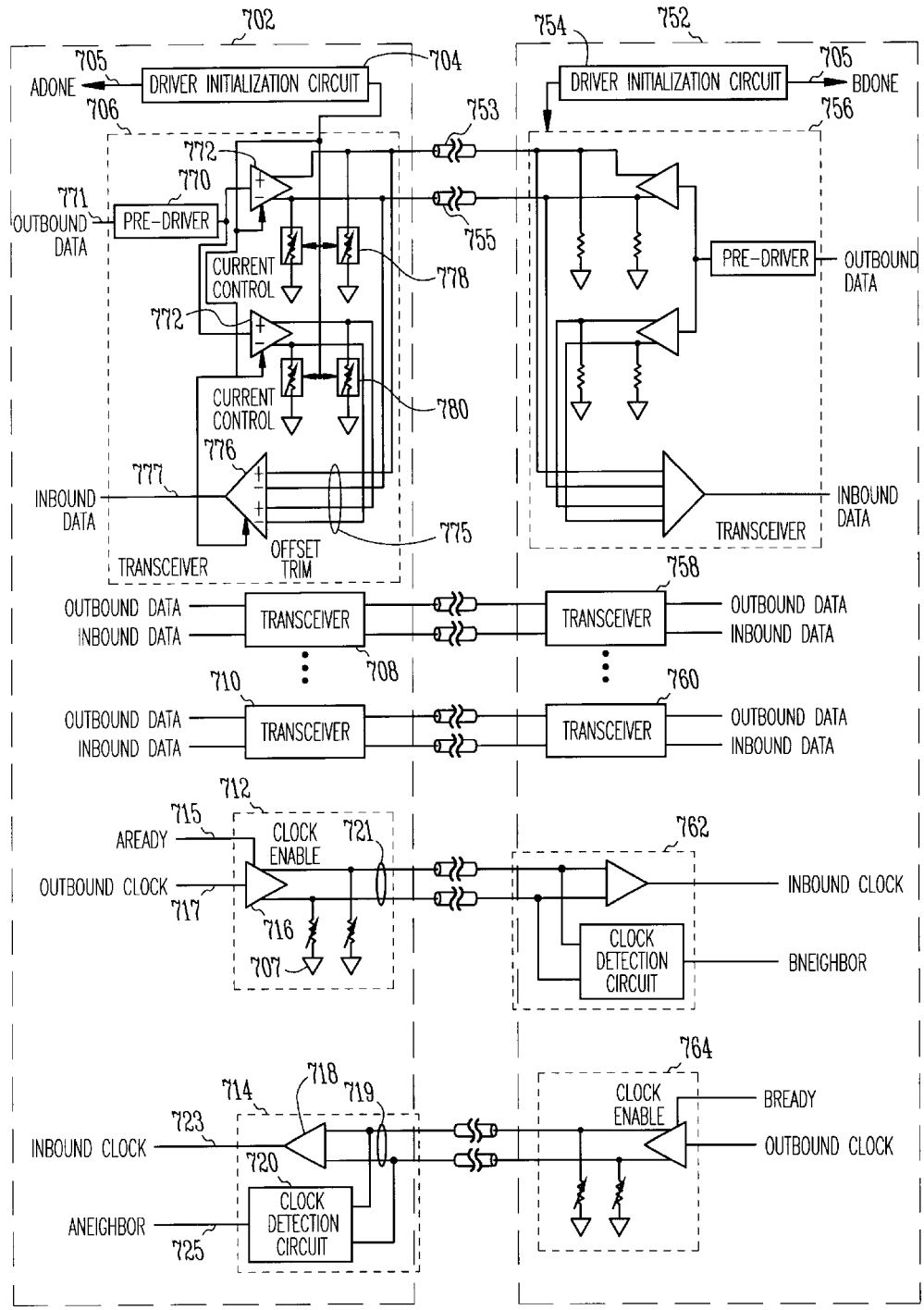
FIG. 7 shows a diagram of two integrated circuits coupled together.

FIG. 7 shows a diagram of two integrated circuits coupled together. Integrated circuits 702 and 752 are coupled by a simultaneous bidirectional port and synchronization and clock circuits. For the purposes of explanation, integrated circuit 702 is considered to be the "A" agent on the simultaneous bidirectional bus, and integrated circuit 752 is considered to be the "B" agent on the same simultaneous bidirectional bus. Nodes and signals pertaining to the synchronization and clock circuit within integrated circuit 702 are prefixed with the letter "A," and nodes and signals pertaining to the synchronization and clock circuit within integrated circuit 752 are prefixed with the letter "B."

Integrated circuit 702 includes transceivers 706, 708, and 710, driver initialization circuit 704, clock driver circuit 712, and clock receiver circuit 714. Transceivers 706, 708, and 710 correspond to bidirectional port 108 (FIG. 1), driver initialization circuit 704 corresponds to initialization circuit 110 (FIG. 1), and the combination of clock driver circuit 712 and clock receiver circuit 714 corresponds to synchronization and clock circuit 112 (FIG. 1). Any number of transceivers can exist within integrated circuits 702 and 752. For ease of explanation, three transceivers are shown within integrated circuit 702 and 752.

Driver initialization circuit 704 provides initialization functions to transceivers 706, 708, and 710, and asserts an ADONE signal on node 705 when initialization is complete. For ease of illustration, FIG. 7 shows driver initialization circuit 704 coupled only to transceiver 706. In some embodiments, driver initialization circuit 704 is coupled to every driver within the integrated circuit.

Clock driver circuit 712 includes clock driver 716. Clock driver 716 receives an OUTBOUND CLOCK signal on node 717 and receives an AREADY signal on clock enable node 715. When the AREADY signal on node 715 is asserted, clock driver 716 drives a clock signal off of integrated circuit 702 on differential node 721 by switching currents between the two halves of differential node 721. When the AREADY signal on node 715 is de-asserted, clock driver 716 does not drive a clock signal on differential node 721. In some embodiments, clock driver 716 presents a high impedance to differential node 721 when the AREADY signal on node 715 is de-asserted. In other embodiments, clock driver 716 drives a static voltage value on node 721 when the AREADY signal on node 715 is de-asserted.

Clock receiver circuit 714 includes clock receiver 718 and clock detection circuit 720. Clock receiver 718 and clock detection circuit 720 both have input nodes coupled to differential node 719 to receive a clock signal from a node external to integrated circuit 702. Clock receiver circuit 718 receives an external clock signal on node 719 and provides the INBOUND CLOCK signal to integrated circuit 702 on node 723. Clock detection circuit 720 receives the external clock signal on node 719 and provides the ANEIGHBOR signal to integrated circuit 702 on node 725.

In some embodiments, clock detection circuit 720 includes a state machine to detect a sequence of voltage transitions on differential node 719. When a sequence of voltage transitions is detected on node 719, the state machine asserts the ANEIGHBOR signal to indicate that a clock has been detected. In other embodiments, clock detection circuit 720 includes a phase locked loop to detect the presence of a clock signal on node 719. When the phase locked loop locks, a lock indication is utilized to assert the ANEIGHBOR signal to indicate that a clock signal is present on node 719. In still other embodiments, clock detection circuit 720 includes a delay locked loop.

Integrated circuit 752 includes driver initialization circuit 754, transceivers 756, 758, and 760, clock driver circuit 764, and clock receiver circuit 762. The description of integrated circuit 752 is the same as that provided above for integrated circuit 702 with the exception of some signals being prefixed with a "B" rather than an"A."

In operation, driver initialization circuits 704 and 754 provide initialization functions to the various data transceivers, and assert ADONE and BDONE signals when the initialization functions are complete. Each of the ADONE and BDONE signals provides an indication to the respective integrated circuit that the initialization is complete. For example, when driver initialization in integrated circuit 702 is complete, the ADONE signal is asserted, and when driver initialization in integrated circuit 752 is complete, the BDONE signal is asserted.

When one of integrated circuits 702 and 752 is ready to communicate with the other, such as when initialization is complete, the appropriate READY signal is asserted. For example, when integrated circuit 702 is ready to communicate over the simultaneous bidirectional bus, integrated circuit 702 asserts the AREADY signal. As a result, clock driver circuit 712 drives a clock signal on node 721 and the BNEIGHBOR signal is asserted within integrated circuit 752. Also for example, when integrated circuit 702 is ready to communicate over the simultaneous bidirectional bus, integrated circuit 752 asserts the BREADY signal. As a result, clock driver circuit 764 drives a clock signal on node 719 and the ANEIGHBOR signal is asserted within integrated circuit 702.

Transceivers 706 and 756 are interconnected by conductors 753 and 755. In the embodiments represented by FIG. 7, conductors 753 and 755 are transmission lines having a characteristic impedance of $Z_0$. Transceivers 706 and 756 communicate bidirectionally and simultaneously, each using both conductors 753 and 755.

Transceiver 706 includes pre-driver 770, current mode output driver 772, current mode return driver 774, differential receiver 776, and termination resistors 778 and 780. Outbound data on node 771 is data generated within integrated circuit 702 that is to be transmitted through conductors 753 and 755 to be received by integrated circuit 752. Pre-driver 770 accepts the outbound data and drives current mode output driver 772, which in turn drives nodes coupled to conductors 753 and 755. The outputs of current mode output driver 772 also feedback into integrated circuit 702, and drive a differential input node of differential receiver 776. Current mode return driver 774 drives differential data lines 775. Differential data lines 775 do not drive nodes off integrated circuit 702, but do feedback into integrated circuit 702 to drive a second differential input node of differential receiver 776.

Current mode output driver 772 switches current between conductors 753 and 755 as a function of the logical state of data on node 771. Likewise, current mode return driver 774 switches current between differential data lines 775 as a function of the logical state of data on node 771.

As previously described, differential receiver 776 has two sets of differential input nodes, one coupled to conductors 753 and 755, and the other coupled to differential data lines 775. Conductors 753 and 755 include data driven by both integrated circuits 702 and 752. In contrast, data lines 775 only include data driven by integrated circuit 702. Differential receiver 776 subtracts the differential voltage on conductors 753 and 755 from a differential voltage on differential data lines 775 to produce inbound data on node 777. Inbound data on node 777 represents the outbound data sent from integrated circuit 752 to integrated circuit 702 across the simultaneous bidirectional interface.

In some embodiments, pre-driver 770 produces pre-equalization data from the outbound data and provides drivers 772 and 774 with both outbound data and pre-equalization data. For example, in some embodiments, pre-driver 770 drives a replica of the outbound data as well as pre-equalization data on multiple physical nodes to drivers 772 and 774. Pre-equalization data is utilized within driver 772 to adjust the amplitude of the output current drive on conductors 753 and 755 to compensate for channel variations in the conductors. In other embodiments, pre-driver 770 does not perform equalization other than to time-align data received by drivers 772 and 774.

As previously described, drivers 772 and 774 are current mode drivers that switch currents between output nodes as a function of the logical state of the input node. Current mode output driver 772 drives a differential current on conductors 753 and 755. This differential current is terminated by the characteristic impedance ($Z_0$) of the conductors, and the resistance ($R_1$) of resistors 778. Therefore, current mode output driver 772 is terminated with an impedance equal to the parallel combination of $Z_0$ and $R_1$. In contrast, current mode return driver 774 drives differential data lines 775 which are terminated only by resistors 780 having a resistance value of $R_2$.

In embodiments represented by FIG. 7, driver initialization circuit 704 can initialize multiple aspects of the transceivers. For example, driver initialization circuit 704 can initialize the resistance values of resistors 778 and 780, the drive currents of drivers 772 and 774, and the offset trim of differential amplifier 776. In some embodiments, the resistance values are set first to match the characteristic impedance of the conductors 753 and 755. Then, the current drive of current mode drivers 772 and 774 are set to achieve a desired voltage swing on conductors 753 and 755 and differential data lines 775. Once these values are set, driver initialization circuit 704 asserts ADONE, and the synchronization sequence continues as described above.

In some embodiments, clock driver circuit 712 includes variable resistors 707 that can be initialized in a manner similar to termination resistors in the transceiver circuits. Also, in some embodiments, clock driver 716 includes a variable current source similar to current mode drivers 772 and 774, and the initialization of the current drive of clock driver 716 is performed as part of the initialization and synchronization.

The remaining figures show embodiments of a variable resistor suitable for use as resistors 778 and 780, and a variable current mode driver suitable for use as current mode drivers 772 and 774.

Figure 8:
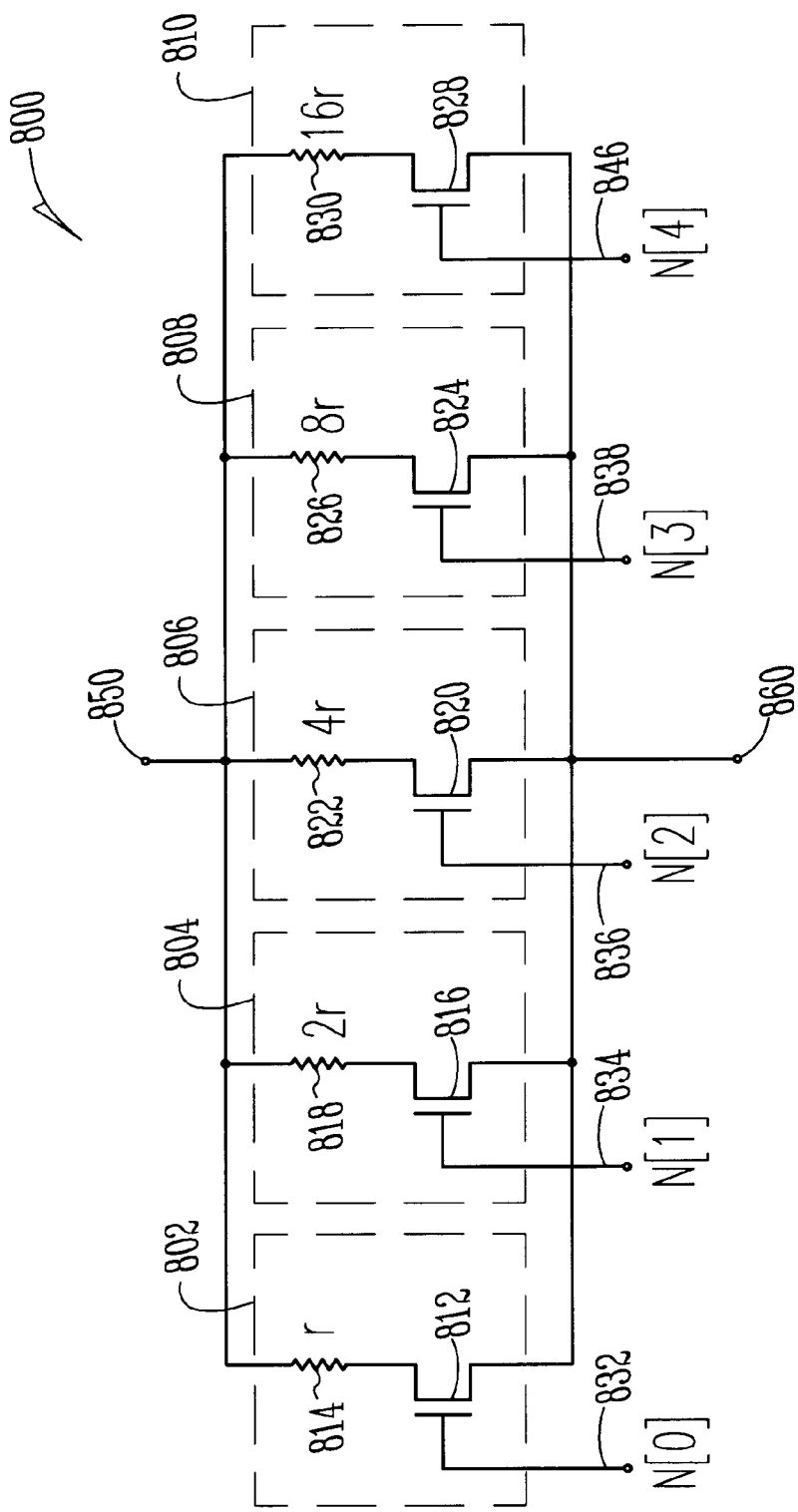
FIG. 8 shows a variable resistor.

FIG. 8 shows a variable resistor suitable for use as variable resistor 778 or 780 (FIG. 7). Variable resistor 800 includes multiple resistive devices, each having a control input node. For example, variable resistor 800 includes resistive devices 802, 804, 806, 808, and 810. Each of the resistive devices includes a transistor and a fixed value resistor. For example, resistive device 802 includes NFET 812 and resistor 814. Likewise, resistive devices 804, 806, 808, and 810 include NFETs 816, 820, 824, and 828 and resistors 818, 822, 826, and 830, respectively.

In embodiments represented by FIG. 8, transistors 812, 816, 820, 824, and 828 are n-channel metal oxide semiconductor field effect transistors (NMOSFETs), also referred to as "NFETs." Other types of transistors can also be used. For example, embodiments exist that utilize bipolar junction transistors (BJTs) and junction field effect transistors (JFETs). One of ordinary skill in the art will understand that many other types of transistors can be utilized without departing from the scope of the present invention.

Each resistive device is coupled in parallel between two reference nodes 850 and 860. Each resistive device includes a control input node having a signal that either turns on or turns off the NFET. For example, NFET 812 within resistive device 802 has a gate driven with the signal on control node 832. Likewise, control nodes 834, 836, 838, and 840 provide control signals to NFETs 816, 820, 824, and 828, respectively.

The resistors within the resistive devices can be any type of resistor fabricated on an integrated circuit. In some embodiments, resistors are fabricated as n-well resistors, as is known in the art. In the embodiment shown in FIG. 8, the resistive devices have binary weighted resistance values. For example, resistor 814 has a resistance value of "r," and resistor 818 has a resistance value of "2r." The resistance values double for each resistive device, and the largest resistance value of "16r" exists in resistive device 810.

Control input nodes 832, 834, 836, 838, and 840, taken together, form a control bus. In the embodiment of FIG. 8, this control bus is driven by a five bit wide signal labeled N[4:0]. This control bus corresponds to the output of driver initialization circuit 704 (FIG. 7). By varying which control signals are asserted, 31 different resistance values can be obtained between nodes 850 and 860.

Variable resistor 800 has been described with resistive devices, each including a resistor with a binary weighting relative to the other resistors. Any number of resistive devices can be included without departing from the scope of the present invention. Binary weighting can be maintained with a large number of resistive devices, or a linear weighting can be employed. For example, variable resistor 800 can be implemented with each resistive device including a resistor of equal value. This reduces the number of possible resistance values available, but also reduces the possibility of a transient resistance value appearing when signal values on the input bus change.

Figure 9:
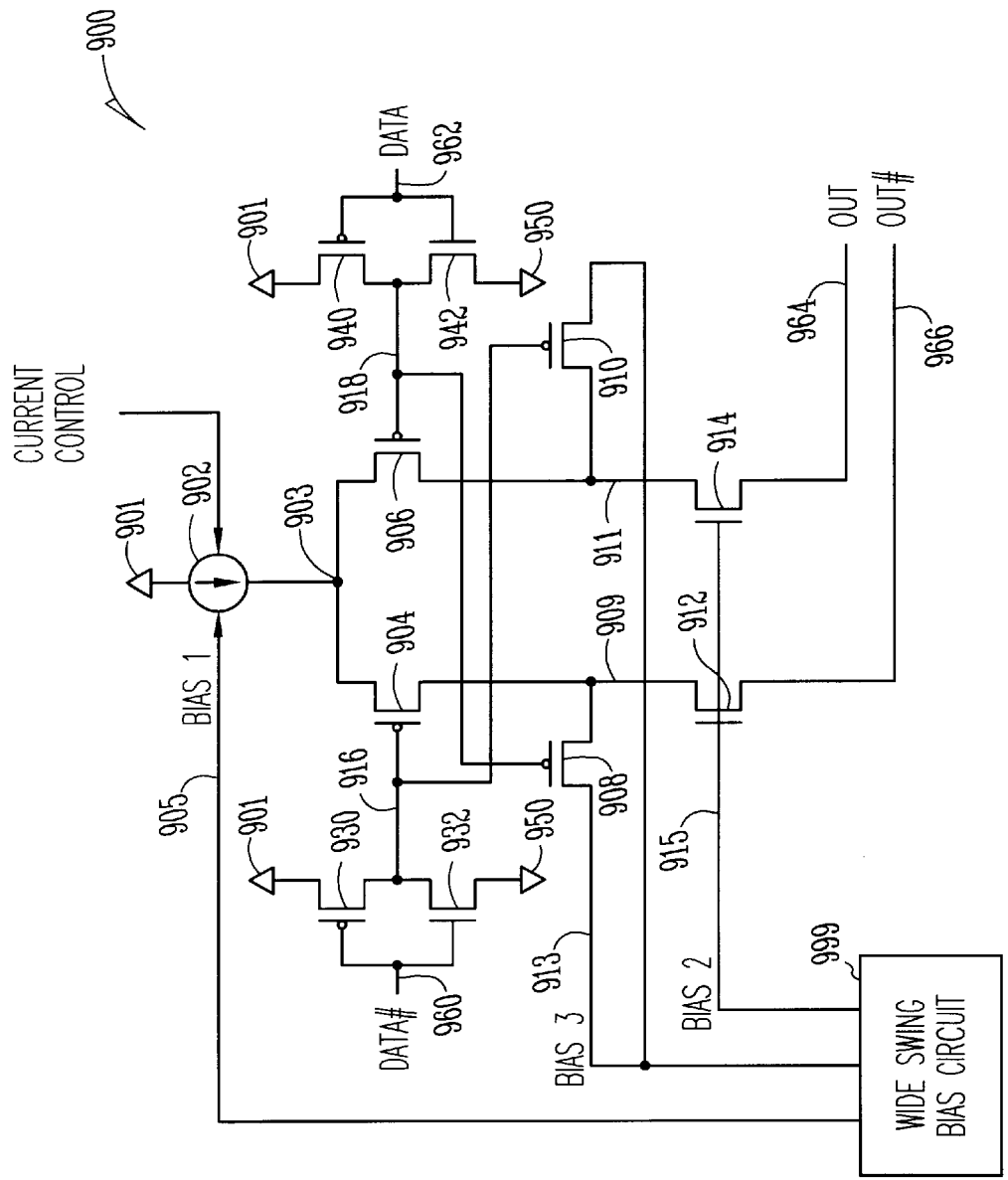
FIG. 9 shows a current mode driver having a variable current drive.

FIG. 9 shows a current mode driver having a variable current drive, suitable for use as current mode driver 772 (FIG. 7). Current driver 900 has a pair of differential input nodes 960 and 962, and a pair of differential output nodes 964 and 966. In operation, a digital signal and its logical complement, "DATA" and "DATA#," are provided on differential input nodes 962 and 960, respectively. In response to the digital input signal, a current appears on one of the two differential output nodes 964 and 966. For example, when the DATA signal is high, and the DATA# signal is low, a current signal "OUT" appears on node 964, and no current appears on node 966. When the input signals on differential input nodes 960 and 962 are in the opposite state, no current appears on node 964, and a current signal "OUT#" appears on node 966.

Current mode driver 900 includes variable current source 902, and transistors 904, 906, 908, 910, 912, and 914. Variable current source 902 sources a variable amount of current from power supply node 901 to internal node 903. The amount of current sourced by variable current source 902 is determined in part by a bias voltage on node 905, shown as "BIAS1" in FIG. 9, and is also determined in part by the stat of control signals received from the driver initialization circuit, shown as "CONTROL" in FIG. 9.

All of the transistors shown in FIG. 9, with the exception of transistors 932 and 942, are p-type metal oxide semiconductor field effect transistors (PMOSFETs), also referred to as PMOS transistors. The method and apparatus of the present invention is not limited to the use of PMOS transistors. For example, in some embodiments, n-type (NMOS) transistors are employed, and in others, bipolar junction transistors (BJT) are employed. One skilled in the art will appreciate that a multitude of embodiments exist, each having different types of transistors and combinations of types of transistors. All of these embodiments are within the scope of the present invention.

Transistors 904 and 906 form a differential input pair driven by differential data signals on nodes 916 and 918. In operation, the differential data signals on nodes 916 and 918 are generated by complementary metal oxide semiconductor (CMOS) drivers created from transistors 930, 932, 940, and 942. The differential data signals on nodes 916 and 918 transition substantially between power supply voltages on nodes 901 and 950. This is also referred to as "swinging rail to rail."

As nodes 916 and 918 transition in voltage, transistors 904 and 906 alternately transition between an "off" state and an "on" state. When the transistors are off, they do not conduct current from source to drain, and when on, they do conduct current from source to drain. The current sourced by variable current source 902 is, therefore, switched between the two paths provided by the differential input pair as a function of the input data signal.

Transistor 904 has a gate coupled to node 916, a source coupled to internal node 903, and a drain coupled to cascode node 909. Likewise, transistor 906 has a gate coupled to node 918, a source coupled to internal node 903, and a drain coupled to cascode node 911. As discussed above, because of the switching action of the input differential pair, only one of cascode nodes 909 and 911 has a steady-state current flowing thereon at a time. For example, when the voltage on node 916 is high and the voltage on 918 is low, the current from variable current source 902 flows through input transistor 906 and on node 911, and input transistor 904 is off and no current flows on node 909. Also for example, when the voltage on node 916 is low and the voltage on node 918 is high, the current from variable current source 902 flows through input transistor 904 and on node 909, and input transistor 906 is off and no current flows on node 911.

Current mode driver 900 also includes pre-charge transistors 908 and 910. Pre-charge transistors 908 and 910 charge cascode nodes 909 and 911, respectively, when no current flows on the respective cascode node. For example, when input transistor 904 is off and no current flows on node 909, pre-charge transistor 908 is on and cascode node 909 charges to a voltage value of "BIAS3." Also for example, when input-transistor 906 is off, pre-charge transistor 910 is on and cascode node 911 is charged to "BIAS3." Pre-charge transistors 908 and 910 are examples of pre-charge circuits that pre-charge the cascode nodes when no current flows thereon. In some embodiments, other pre-charge circuits are used to charge the cascode nodes.

Current driver 900 also includes cascode output transistors 912 and 914. Cascode output transistor 912 is coupled from source to drain between cascode node 909 and output node 916. Likewise, cascode transistor 914 is coupled from source to drain between cascode node 911 and output node 964. Cascode output transistors 912 and 914 are biased in saturation by a bias voltage "BIAS2" provided on node 915 by wide-swing bias circuit 999.

The effective output capacitance of current driver 900 is small in part because cascode output transistors 912 and 914 operate in saturation, which provides a high impedance path to all of the parasitic capacitances at the internal nodes of current driver 900. Current driver 900 also has a high output impedance achieved by the cascode connections.

Because input transistors 904 and 906 have rail to rail input swings, they can be sized much smaller than cascode output transistors 912 and 914. As a result, the gate capacitance on nodes 916 and 918 can be kept relatively small, thereby reducing the dynamic power consumption of the CMOS drivers.

Figure 10:
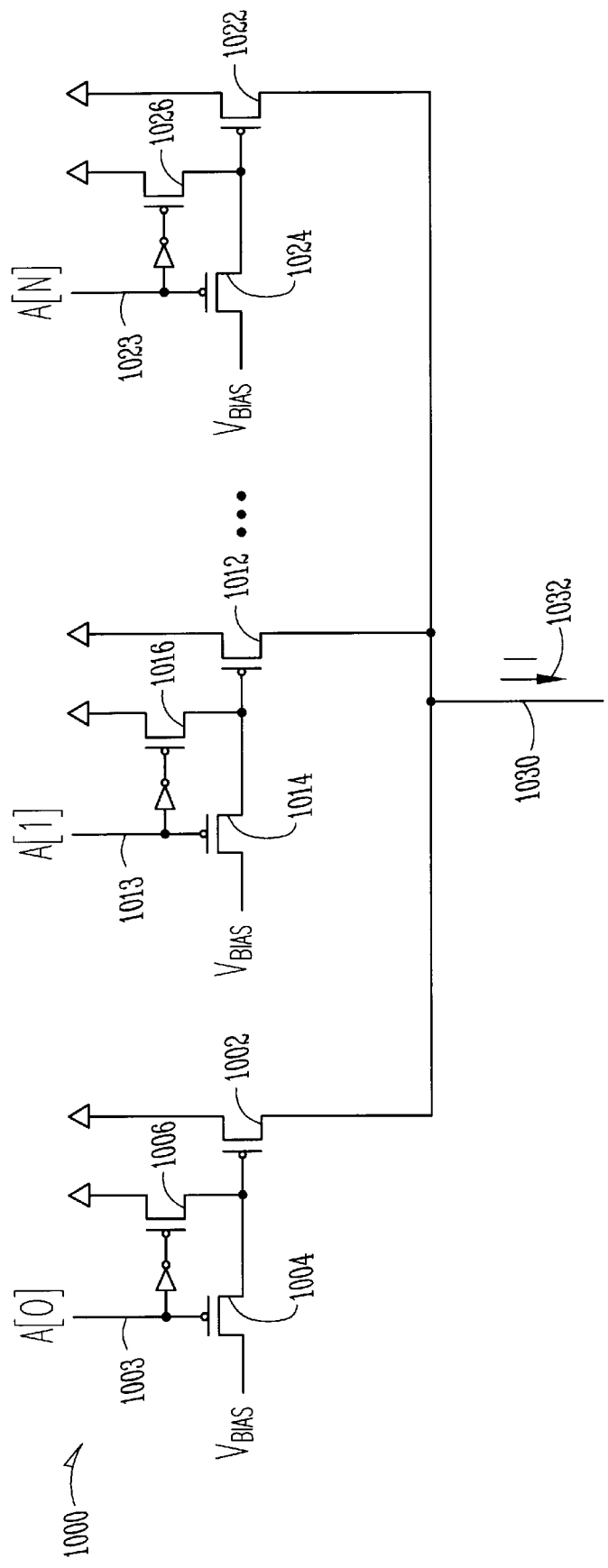
FIG. 10 shows a variable current source.

FIG. 10 shows a variable current source suitable for use as variable current source 902 (FIG. 9). Current source 1000 includes a plurality of selectable current source circuits. For example, one selectable current source circuit includes current source transistor 1002 and select transistors 1004 and 1006. Likewise, another selectable current source circuit includes current source transistor 1012 and select transistors 1014 and 1016. Furthermore, another selectable current source circuit includes current source transistor 1022 and select transistors 1024 and 1026. Current source 1000 is shown having three selectable current source circuits, but any number of selectable current source circuits can be included without departing from the scope of the present invention.

In operation, a current source transistor is selected by varying the signals controlling the select transistors connected thereto. For example, current source transistor 1002 has a gate coupled to a bias voltage through select transistor 1004 and coupled to a reference potential through select transistor 1006. When control signal Al is asserted, select transistor 1004 conducts and select transistor 1006 does not. As a result, current source transistor 1002 has the bias voltage imposed from gate to source thereby providing a current that contributes to current 1032 on node 1030. When control signal Al is de-asserted, select transistor 1004 is off and select transistor 1006 is on, thereby coupling the gate of current source transistor 1002 to the reference potential and turning current source transistor 1002 off.

Any number of current source transistors can be on, and any number of current source transistors can be off, based on the values of the control signals shown in FIG. 10. In embodiments represented by FIG. 10, each current source transistor sources substantially the same current when the bias voltage is applied to the gate. In other embodiments, different bias voltages are provided to the different current source transistors, thereby providing a different weight to each selectable current source circuit. In still other embodiments, each current source transistor is a different size, thereby providing a different amount of current from the same bias voltage. For example, each current source transistor can be sized in a binary fashion such that a binary control word can be applied to variable current source 1000 to provide a greater range of current values.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A bi-directional port circuit comprising:
    a data transceiver;
    a clock driver with an enable input node;
    a control circuit to drive the enable input node when the data transceiver is initialized; and
    a clock receiver circuit having a clock detection circuit to detect the presence of an incoming clock signal;
    wherein the control circuit comprises an initialization circuit to initialize the data transceiver.

2. The bi-directional port circuit of claim 1 wherein the data transceiver comprises:
    a voltage mode output driver having an output node; and
    a data receiver having an input node coupled to the output node of the voltage mode driver.

3. The bi-directional port circuit of claim 1 wherein the data transceiver comprises:
    a current mode output driver having a differential output node; and
    a data receiver having a differential input node coupled to the differential output node of the current mode driver.

4. The bi-directional port circuit of claim 1 wherein the initialization circuit comprises an impedance control circuit.

5. The bi-directional port circuit of claim 4 wherein the control circuit is operative to enable the clock driver when the impedance control circuit has initialized an impedance of the data transceiver.

6. The bi-directional port circuit of claim 5 wherein:
    the data transceiver includes a voltage mode driver having an output impedance; and
    the impedance initialized by the impedance control circuit is the output impedance of the voltage mode driver.

7. The bi-directional port circuit of claim 5 wherein:
    the data transceiver includes a current mode driver having at least one termination resistor; and
    the impedance initialized by the impedance control circuit is the at least one termination resistor.

8. The bi-directional port circuit of claim 1 wherein:
    the data transceiver includes a variable current source circuit; and
    the initialization circuit is operative to initialize the variable current source circuit.

9. The bi-directional port circuit of claim 1 wherein:
    the data transceiver includes a receiver circuit having a variable offset; and
    the initialization circuit is operable to initialize the variable offset of the receiver circuit.

10. An integrated circuit comprising:
    an output driver to drive a data signal on a data node external to the integrated circuit;
    an initialization circuit to initialize the output driver; and
    a clock driver responsive to the initialization circuit such that the clock driver drives an outbound clock signal off the integrated circuit when the output driver is initialized;
    wherein the output driver is a voltage mode driver with a programmable output impedance.

11. The integrated circuit of claim 10 wherein the initialization circuit comprises an impedance control circuit to initialize the programmable output impedance.

12. The integrated circuit of claim 10 further comprising a clock receiver circuit to receive an inbound clock signal from an inbound clock node external to the integrated circuit.

13. The integrated circuit of claim 12 wherein the clock receiver circuit comprises a clock detection circuit to detect whether a signal is present on the inbound clock node external to the integrated circuit.

14. The integrated circuit of claim 12 further comprising a data receiver to receive a data signal on the data node external to the data circuit.

15. An integrated circuit comprising:
    an output driver to drive a data signal on a data node external to the integrated circuit;
    an initialization circuit to initialize the output driver; and
    a clock driver responsive to the initialization circuit such that the clock driver drives an outbound clock signal off the integrated circuit when the output driver is initialized;
    wherein the output driver is a current mode driver with a variable current source; and
    wherein the initialization circuit is operative to initialize the variable current source.

16. An integrated circuit comprising:
    an output driver to drive a data signal on a data node external to the integrated circuit;
    an initialization circuit to initialize the output driver; and
    a clock driver responsive to the initialization circuit such that the clock driver drives an outbound clock signal off the integrated circuit when the output driver is initialized;
    wherein the output driver is a current mode driver with a variable termination resistor; and
    wherein the initialization circuit is operative to initialize the variable termination resistor.

17. The integrated circuit of claim 16 further comprising a clock receiver circuit to receive an inbound clock signal from an inbound clock node external to the integrated circuit.

18. The integrated circuit of claim 17 wherein the clock receiver circuit comprises a clock detection circuit to detect whether a signal is present on the inbound clock node external to the integrated circuit.

19. The integrated circuit of claim 17 further comprising a data receiver to receive a data signal on the data node external to the data circuit.

20. The integrated circuit of claim 19 further comprising a processor coupled to the data output driver, the enable node of the clock driver, and the clock detect node of the clock detection circuit.

21. An integrated circuit comprising:

an output driver to drive a data signal on a data node external to the integrated circuit;

an initialization circuit to initialize the output driver; and a clock driver responsive to the initialization circuit such that the clock driver drives an outbound clock signal off the integrated circuit when the output driver is initialized;

wherein the integrated circuit is a circuit type from the group consisting of: a processor, a processor peripheral, a memory, and a memory controller.

22. An electronic system comprising:

a first integrated circuit having a first simultaneous bi-directional port comprising a first data driver, a first data receiver, a first clock driver with a first enable input node, and a first clock receiver with a first clock detect circuit; and a second integrated circuit having a second simultaneous bi-directional port comprising a second data driver, a second data receiver, a second clock driver with a second enable input node, and a second clock receiver with a second clock detect circuit;

wherein output nodes of the first and second data drivers are coupled in common with input nodes of the first and second data receivers, the first and second integrated circuits include initialization circuits, and the first and second enable input nodes are coupled to the initialization circuits to enable clock signals after the first and second simultaneous bi-directional ports are initialized.

23. The electronic system of claim 22 wherein the first data driver has a programmable output impedance, and the initialization circuit of the first integrated circuit is operative to set the programmable output impedance.

24. The electronic system of claim 22 wherein the first data driver has a programmable current source, and the initialization circuit of the first integrated circuit is operative to set the programmable current source.

25. The electronic system of claim 22 wherein the first data driver has a programmable slew rate, and the initialization circuit of the first integrated circuit is operative to set the programmable slew rate.

26. The electronic system of claim 22 wherein the first data driver has a programmable termination resistor, and the initialization circuit of the first integrated circuit is operative to set the programmable termination resistor.

27. The electronic system of claim 22 wherein the first data receiver has a programmable offset, and the initialization circuit of the first integrated circuit is operative to set the programmable offset.

* * * * *

UNITED STATES PATENT AND TRADEMARK OFFICE
CERTIFICATE OF CORRECTION

PATENT NO. : 6,791,356 B2
DATED : September 14, 2004
INVENTOR(S) : Haycock et al.

It is certified that error appears in the above-identified patent and that said Letters Patent is hereby corrected as shown below:

Title page,
Item [56], References Cited, U.S. PATENT DOCUMENTS, before "5,134,311" insert

| | | | |
|---|---|---|---|
| -- 4,280,221 | 07/1981 | Chun et al. | 375/288 |
| 4,477,896 | 10/1984 | Aker | 370/201 |
| 4,573,168 | 02/1986 | Henze et al. | 375/36 |
| 4,624,006 | 11/1986 | Rempfer et al. | 377/69 |
| 5,128,962 | 07/1992 | Kerslake et al. | 345/7 --; | before "5,216,667" insert

| | | | |
|---|---|---|---|
| -- 5,164,960 | 11/1992 | Winen et al. | 375/10 |
| 5,179,577 | 01/1993 | Llyadis | 375/317 --; | before "5,325,355" insert

| | | | |
|---|---|---|---|
| -- 5,218,239 | 06/1993 | Boomer | 307/443 |
| 5,253,249 | 10/1993 | Fitzgerald et al. | 370/24 --; | before "5,481,207" insert

| | | | |
|---|---|---|---|
| -- 5,347,177 | 09/1994 | Lipp | 326/30 |
| 5,457,406 | 10/1995 | Takada et al. | 326/30 --; | before "5,530,377" insert

| | | | |
|---|---|---|---|
| -- 5,490,171 | 02/1996 | Epley et al. | 375/257 --; | before "5,874,837" insert

| | | | |
|---|---|---|---|
| -- 5,793,248 | 08/1998 | Lee et al. | 327/543 |
| 5,818,884 | 10/1998 | Raymond | 375/354 |
| 5,841,827 | 11/1998 | Chevallier | 377/20 --; | before "6,087,847" insert

| | | | |
|---|---|---|---|
| -- 6,037,811 | 03/2000 | Ozguc | 327/108 |
| 6,040,714 | 03/2000 | Klein | 326/86 --; | before "6,157,206" insert

| | | | |
|---|---|---|---|
| -- 6,133,749 | 10/2000 | Hansen et al. | 326/30 --; | before "6,226,331" insert

| | | | |
|---|---|---|---|
| -- 6,188,237 | 02/2001 | Suzuki et al. | 326/30 --; and | below "6,366,867" insert

| | | | |
|---|---|---|---|
| -- 6,529,037 | 03/2003 | Haycock et al. | 326/30 --. |

OTHER PUBLICATIONS, "Comer, D.T., et al.," reference, delete "site," and insert -- site. --, therefor.

UNITED STATES PATENT AND TRADEMARK OFFICE
CERTIFICATE OF CORRECTION

PATENT NO. : 6,791,356 B2
DATED : September 14, 2004
INVENTOR(S) : Haycock et al.

It is certified that error appears in the above-identified patent and that said Letters Patent is hereby corrected as shown below:

<u>Title page (cont'd)</u>,
Item [57], ABSTRACT,
Line 1, delete "bidirectional" and insert -- bi-directional --, therefor.
Line 14, delete "bidirectional" and insert -- bi-directional --, therefor.

Signed and Sealed this

Fourth Day of January, 2005

JON W. DUDAS
*Director of the United States Patent and Trademark Office*